Figure 4:
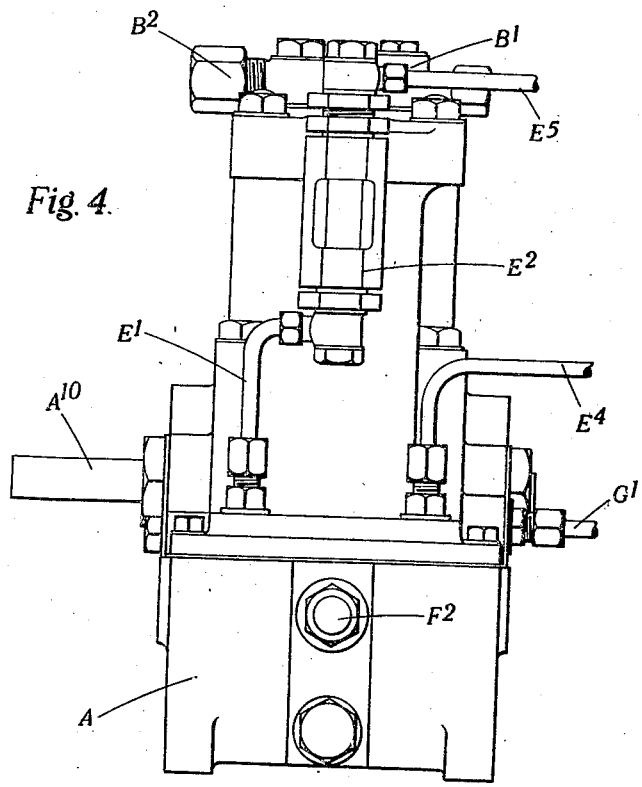

Sept. 30, 1941. F. N. TRIER ET AL 2,257,251
DISTRIBUTING APPARATUS OF THE PISTON AND CYLINDER TYPE
Filed Nov. 1, 1938 5 Sheets-Sheet 1
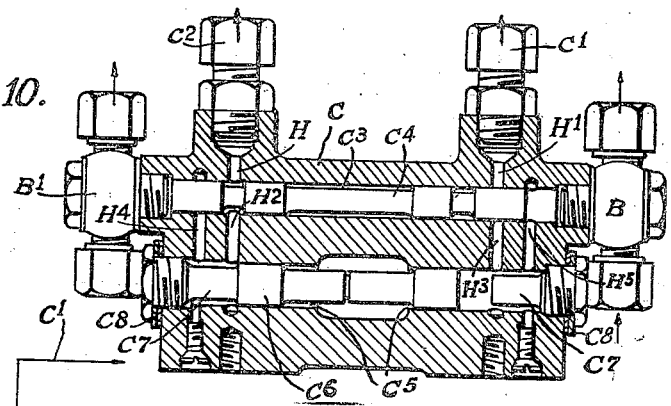
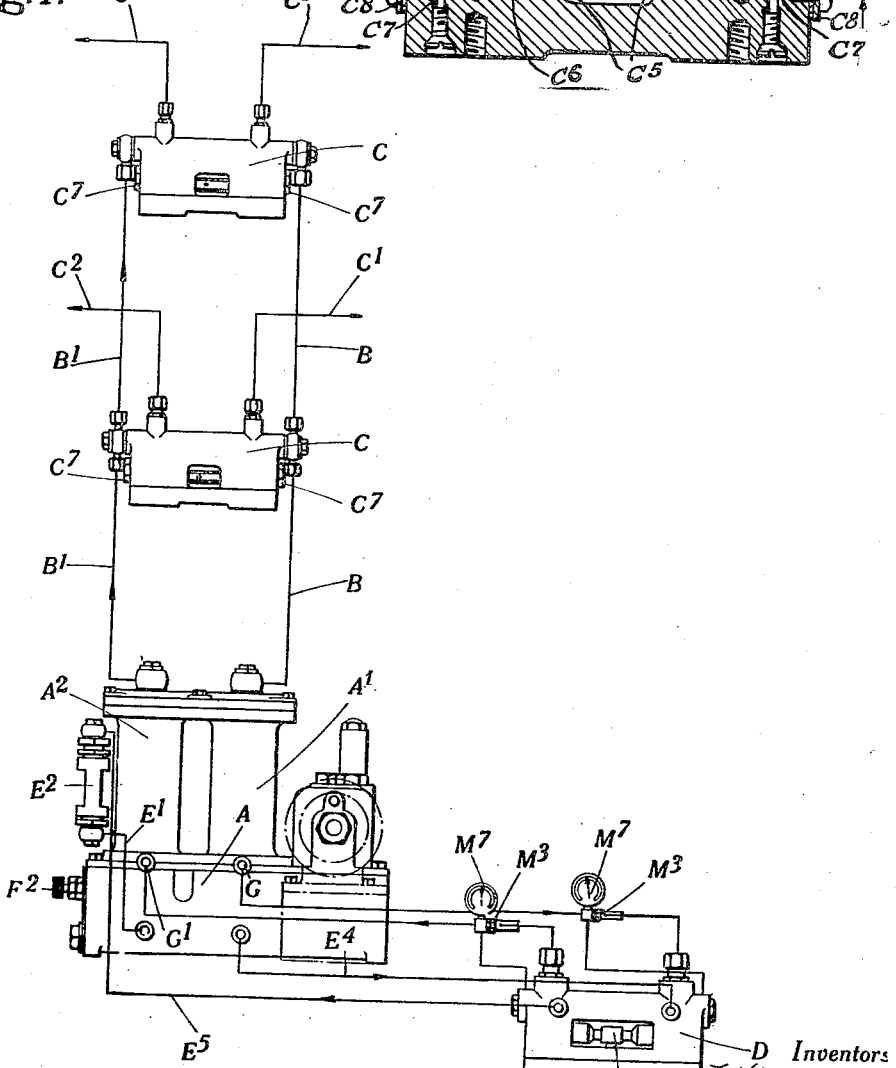
Inventors
F. N. Trier
P. F. Crothers
Attorneys

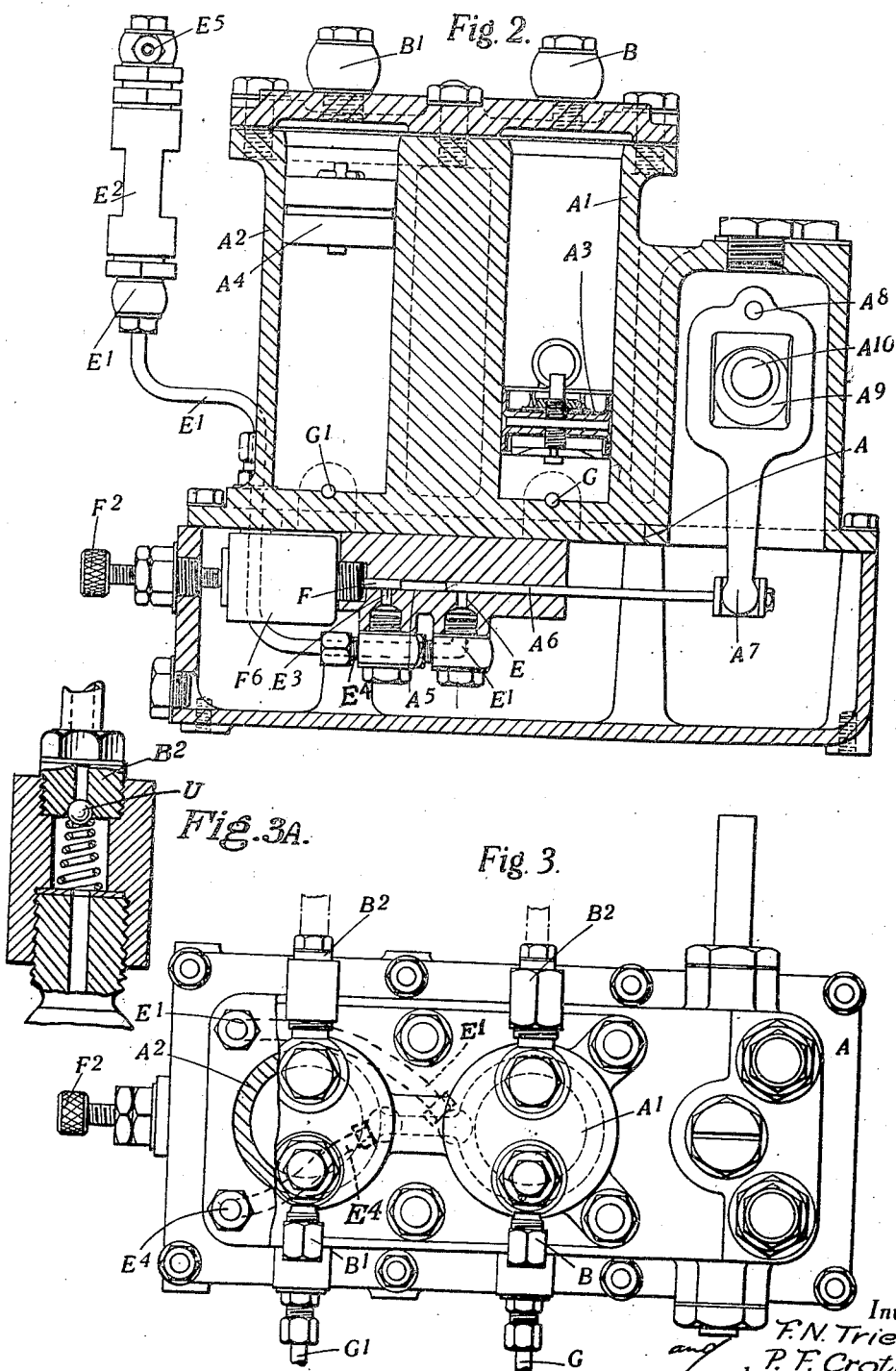

Sept. 30, 1941.   F. N. TRIER ET AL   2,257,251
DISTRIBUTING APPARATUS OF THE PISTON AND CYLINDER TYPE
Filed Nov. 1, 1938   5 Sheets-Sheet 3

Inventors
F. N. Trier
P. F. Crothers
by
Attorney

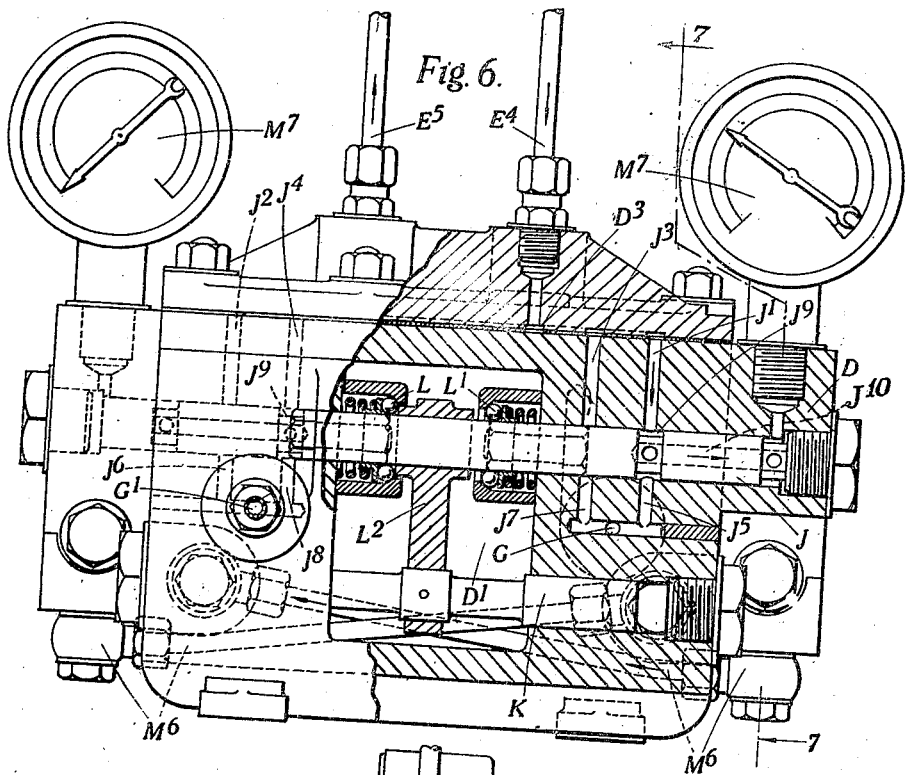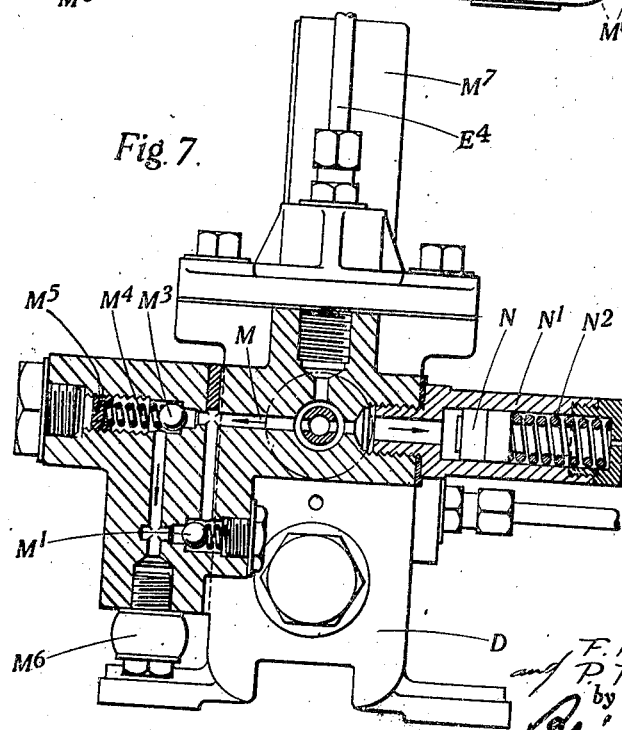

Sept. 30, 1941.   F. N. TRIER ET AL   2,257,251
DISTRIBUTING APPARATUS OF THE PISTON AND CYLINDER TYPE
Filed Nov. 1, 1938   5 Sheets—Sheet 5

Inventors
F. N. Trier
P. F. Crothers

Patented Sept. 30, 1941

2,257,251

UNITED STATES PATENT OFFICE 2,257,251

DISTRIBUTING APPARATUS OF THE PISTON AND CYLINDER TYPE

Frank Newton Trier and Paul Faulkner Crothers, London, England, assignors to Trier Bros. Limited, London, England, a company of Great Britain Application November 1, 1938, Serial No. 238,292
In Great Britain November 3, 1937

10 Claims. (Cl. 184—7)

This invention relates to distributing apparatus of the piston and cylinder type for lubricant or other liquid or semi-liquid substances and of the kind comprising a cylinder in which is mounted to slide a floating piston which divides the cylinder into two chambers one of which is adapted to be filled with the substance to be discharged while the other is connected to means, for example a pump, for delivering liquid thereto under pressure and at a rate determined in accordance with the desired rate of discharge.

For the sake of convenience the chamber which contains the substance to be discharged will be referred to as the upper chamber and that to which liquid is delivered under pressure will be referred to as the lower chamber although the opposite arrangement may be employed or the cylinder may be arranged with its axis horizontal or inclined. Further, the liquid delivered to the lower chamber will be referred to as the pressure liquid.

The object of the invention is to provide an improved apparatus of the above kind.

To this end in apparatus of the above kind according to the present invention the upper chamber is connected not only to a discharge passage but also to an inlet passage communicating with a source of supply of the substance to be discharged, while means are provided not only for delivering pressure liquid to the lower chamber to cause movement of the piston to discharge the substance from the upper chamber but also for withdrawing pressure liquid from the lower chamber to cause movement of the piston to replenish the upper chamber through the inlet passage and for causing automatically a reversal of the direction of flow of the pressure liquid when the piston reaches the end of each stroke. Thus the apparatus acts automatically alternately to discharge the substance and then cause refilling of the upper chamber and at the end of the refilling or replenishing operation to begin discharge again.

The apparatus may comprise a single cylinder in which case whereas the delivery of pressure liquid is usually comparatively slow in accordance with the desired rate of discharge of the substance the withdrawal of pressure liquid is conveniently comparatively rapid so that only a comparatively small time interval elapses between the end of one discharge stroke of the piston and the beginning of the next.

Alternatively, however, according to a further feature of the invention, the apparatus may comprise two cylinders each containing a free piston dividing the cylinder into upper and lower chambers. In this case each upper chamber communicates with a discharge passage and an inlet passage while means are provided whereby while pressure liquid is delivered at a determined rate to the lower chamber of one cylinder to cause the piston therein to execute its discharge stroke at the desired speed, pressure liquid is simultaneously withdrawn at the same rate from the lower chamber of the other cylinder to cause its piston to execute its replenishing stroke at the same speed. Means are provided whereby at the end of each discharge stroke of one piston and replenishing stroke of the other, the direction of flow of the pressure liquid is automatically reversed so as to cause the piston in the now replenished cylinder to execute a discharge stroke while that in the now discharged cylinder executes a replenishing stroke. Thus discharge from one cylinder or the other takes place substantially continuously at the desired rate.

The means for effecting the automatic reversal in the direction of flow of the pressure liquid may vary. Conveniently, however, this is effected by a valve or valves adapted to be moved automatically to cause reversal of flow by the variation in pressure in the pressure liquid which occurs when a piston reaches the end of its stroke and is thus held from further movement.

In the single cylinder form of apparatus referred to above, the delivery and withdrawal of pressure liquid are conveniently effected respectively by two pumps, which may for example be of the reciprocating piston type and of different capacity in accordance with the desired rates of pressure liquid flow respectively to and from the lower chamber. In this case, the reversal of flow is conveniently effected by so controlling a valve or valves that during the discharge stroke the delivery side of the smaller capacity pump is connected to the lower chamber, whereas during the replenishing stroke the suction side of the larger capacity pump is connected to the lower chamber.

In the double cylinder form a single pump may be employed with a valve or valves so arranged as to connect the delivery side of the pump to the lower chamber of one cylinder and the suction side of the pump to the lower chamber of the other cylinder so as to cause the discharge stroke in the first cylinder and the replenishing stroke in the second and then to reverse the connections so as to cause the replenishing stroke in the discharged cylinder and the discharge stroke in the replenished cylinder.

Conveniently a valve of the sliding type, for example a piston valve, is employed to control the direction of flow of the pressure fluid, the automatic movement of this valve to effect reversal of flow being effected by variations in pressure acting on one or more valve-operating pistons constituted by or acting on one or both ends of the valve.

Where apparatus employing two main cylinders is employed this may be combined with apparatus for distributing the lubricant or other substance discharged through the delivery pipes from the upper ends of the cylinders in measured quantities to a plurality of points. Such distributing apparatus may comprise one or more distributing devices each comprising inlet passages connected respectively to the two delivery pipes, a double-acting distributing piston arranged in a cylinder (hereinafter called "the piston cylinder") the pressure chambers of which are adapted to be connected respectively to the two delivery pipes and valve means whereby during movement of the piston in each direction under the action of lubricant delivered to one end of the piston cylinder, the other end of the piston cylinder is cut off from its delivery pipe and connected to a feed passage so that the lubricant which was delivered to such other end during the preceding stroke is discharged through the feed passage which leads to one of the distribution points.

Preferably the valve means comprises a shuttle-type piston valve which is mounted in a valve cylinder and which, when lubricant is delivered through one delivery pipe, is moved by the pressure thereof in one direction to open communication between such delivery pipe and the adjacent end of the piston cylinder, to close communication between the other end of the piston cylinder and its delivery pipe and to bring such other end of the piston cylinder into communication with its feed passage.

Thus, in one arrangement the end faces of the piston valve which are acted upon respectively by the lubricant in the two delivery pipes are arranged to cover and uncover ports in the valve cylinder leading respectively to the ends of the piston cylinder while recesses or passages at intermediate points in the length of the valve serve alternately to connect the ends of the piston cylinder to their respective feed passages.

In any case, means may be provided whereby the stroke of the piston of the distributing device or of each distributing device can be varied.

The means for causing automatic reversal of flow of the pressure liquid in the delivery passages leading to the lower ends of the main cylinders may vary but in one arrangement employing an automatically operated change over valve, the pressure in the delivery passage to which pressure fluid is at any time being delivered tends to move the change over valve into a position to cause delivery to the other passage, and fluid-pressure-controlled locking mechanism is provided which serves normally to hold the change over valve from such movement and a releasing member subject directly or indirectly to the fluid pressure in both delivery passages and so constructed and arranged as to move to release the locking mechanism and thus permit movement of the change over valve only when the pressure in the delivery passage to which fluid is being delivered at any time exceeds a determined value. Thus, the releasing member is preferably in the form of a piston, hereinafter called the releasing piston, subject to the pressures in two pressure chambers the fluid pressures in which are derived respectively from the two delivery passages and act thereon in opposite directions, the two pressure chambers communicating with the delivery passages through non-return inlet valves and through relief valves which will only open at the determined pressure.

Preferably the pressure at which the releasing piston or other member operates is controllable, for example by controlling the spring pressure acting on the relief valves referred to.

The invention may be carried into practice in various ways but two constructions according to the invention and a modification of one of such constructions are illustrated by way of example in the accompanying drawings, in which—

Figure 5:
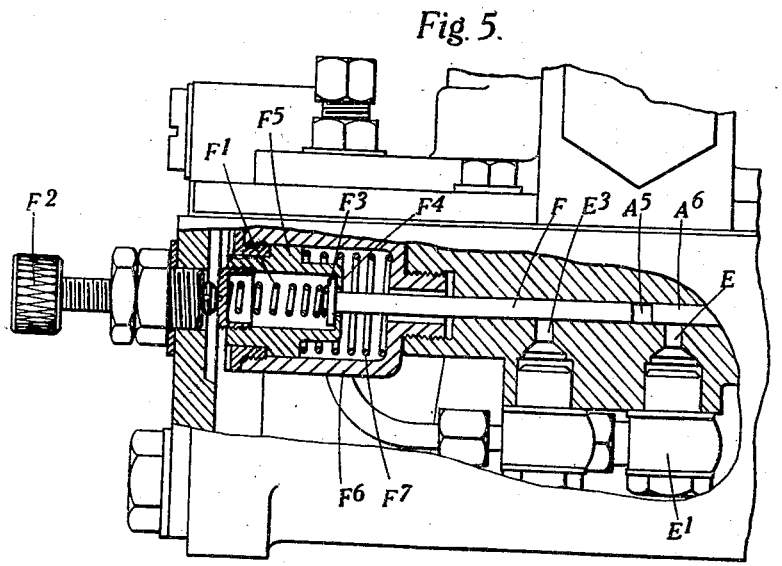
Figure 8:
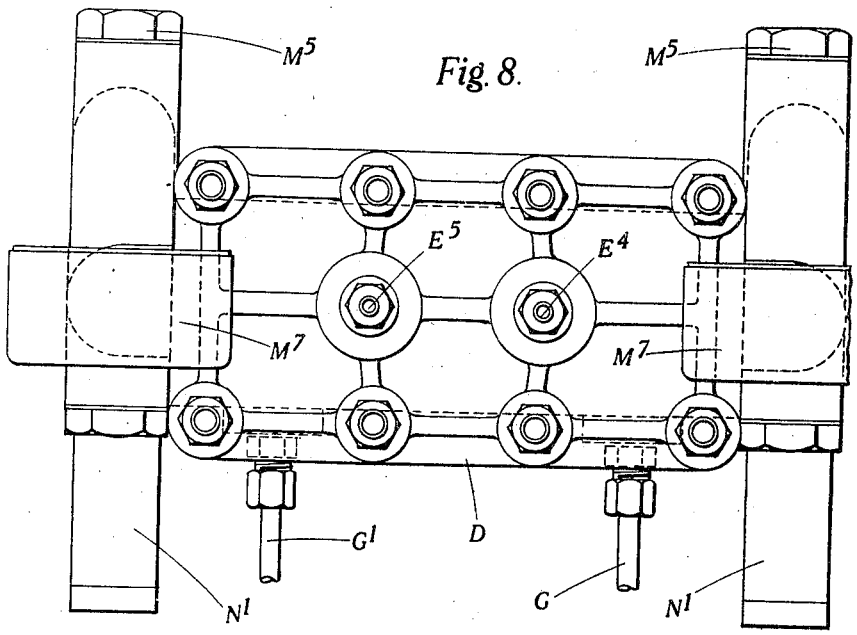
Figure 9:
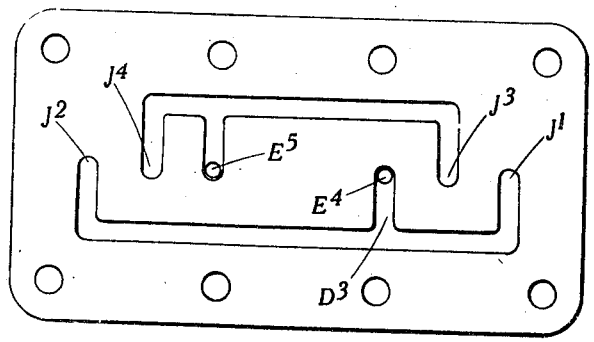

Figure 1 is a diagrammatic illustration of one complete construction according to the invention, Figure 2 is a sectional side elevation of the apparatus employed in Figure 1 to deliver the grease or like lubricating substance, Figure 3 is a plan of the apparatus shown in Figure 2, Figure 3a shows a detail of construction in cross-section, Figure 4 is an end elevation of the apparatus shown in Figure 2, Figure 5 is a section on an enlarged scale of part of the apparatus shown in Figure 2, Figure 6 is a side elevation, partly in section, of mechanism for controlling the operation of the apparatus shown in Figures 2, 3 and 4, Figure 7 is a section on the line 7—7 of Figure 6, Figure 8 is a plan of the apparatus shown in Figure 6, Figure 9 is a plan view showing the arrangement of communicating grooves for the passage of liquid in part of the construction shown in Figure 6, Figure 10 is a sectional side elevation of one of the lubricant measuring and distributing devices employed in the apparatus shown in Figure 1.

The installation shown in Figure 1 comprises apparatus A comprising two cylinders $A^1$, $A^2$ the upper ends of which are connected to lubricant delivery passages B, $B^1$ through which the apparatus delivers lubricant alternately to a series of lubricant measuring and distributing devices C which serves to deliver lubricant to pipes $C^1$, $C^2$ leading to the apparatus to be lubricated, the arrangement being such that when lubricant is delivered to the pipe B by the apparatus A, the devices C distribute and deliver measured quantities of lubricant through the pipes $C^2$, whereas when lubricant is delivered by the apparatus A through the pipe $B^1$, the devices C deliver a measured quantity of lubricant to each of the pipes $C^1$.

The cylinders $A^1$, $A^2$ contain floating pistons $A^3$, $A^4$ and the upper ends of these cylinders are connected to the delivery pipes B, $B^1$ and through conventional non-return valves to suction pipes $B^2$ so that when each piston $A^3$ or $A^4$ is drawn downwards lubricant is drawn in through the upper end of the cylinder, while when the piston is forced upwards lubricant is delivered through the pipe B or $B^1$.

Means are provided for delivering pressure liquid alternately to the chamber on the under side of each piston in the cylinders $A^1$, $A^2$, this delivery of pressure liquid being effected by a pump through master control mechanism D which is so constructed that the pressure liquid is delivered to one cylinder and withdrawn from the other cylinder for the necessary period and then reversal of flow is caused so as to withdraw liquid from the first cylinder and deliver it to the second cylinder and so on, so that delivery of lubricant under pressure is caused to take place alternately to the pipes B, $B^1$.

Figures 2, 3, 3a and 4 show the construction of the apparatus A. Thus, as will be seen, each of the cylinders $A^1$, $A^2$ containing the floating pistons $A^3$, $A^4$ is connected at its upper end to the pipe B or B' and also through a non-return suction valve U shown in Figures 3 and 3a to a suction pipe $B^2$ connected as indicated diagrammatically at $U^1$ to a lubricant reservoir. Arranged in the base of the apparatus A is a pump comprising a cylinder $A^5$ into one end of which extends a pump plunger $A^6$ adapted to be reciprocated by a lever $A^7$ pivoted at $A^8$ and acted upon by an eccentric $A^9$ on a shaft $A^{10}$. Opening into the cylinder $A^5$ at a point where it is uncovered by the plunger $A^6$ at the end of its outstroke but covered during the initial part of its delivery stroke is a suction port E communicating through a passage $E^1$ with the outlet side of a sight feed $E^2$. Extending into the end of the cylinder $A^5$ remote from the plunger $A^6$ is a dummy piston F, shown more clearly in Figure 5, which normally closes a delivery port $E^3$ in the cylinder under the action of a spring $F^1$ but is adapted to be moved against the action of its spring so as to uncover the delivery port $E^3$ during the delivery stroke of the plunger $A^6$ due to the liquid trapped between this plunger and the dummy piston F. The delivery port communicates with a delivery passage or pipe $E^4$. It will be seen that with this arrangement the quantity of pressure liquid delivered by the plunger $A^6$ on each delivery stroke depends upon the position of rest of the dummy piston F and this position is adjustable by means of an adjusting screw $F^2$. Thus, the dummy piston F is provided with a head $F^3$ which is normally pressed by the spring $F^1$ against a stop flange $F^4$ on a housing $F^5$ mounted to slide within a casing $F^6$ and to be moved against the action of a spring $F^7$ by the adjusting screw $F^2$. Thus, the quantity of pressure liquid delivered by the plunger $A^6$ on each delivery stroke can be varied by the adjusting screw $F^2$. A suction passage $E^5$ leads from the upper end of the sight feed $E^2$ and pressure supply passages G, $G^1$ communicate respectively with the lower ends of the cylinders $A^1$, $A^2$.

For the sake of clearness the sight feed $E^2$ is omitted from Figure 3.

The pipes $E^4$, $E^5$, G and $G^1$ communicate with the valve device D whereby the pipe $E^4$ can be connected to the pipe G and the pipe $E^5$ to the pipe $G^1$ or alternatively the pipe $E^4$ can be connected to the pipe $G^1$ and the pipe $E^5$ to the pipe G. The valve device D, which is hereinafter more fully described, acts automatically to change over the connections at the required times so that at one time pressure liquid is delivered through the pipe G to the cylinder $A^1$ and withdrawn from the cylinder $A^2$ through the pipe $G^1$ while at another time pressure liquid is delivered through the pipe $G^1$ to the cylinder $A^2$ and withdrawn from the cylinder $A^1$ through the pipe G. In this way lubricant is delivered alternately to the pipes B and $B^1$.

Each of the lubricant measuring and distributing devices C is constructed as shown in cross-section in Figure 10. Thus, each of these devices comprises a casing C having a bore $C^3$ containing a shuttle type distributing valve $C^4$ and a bore $C^5$ containing a double-ended plunger $C^6$. The ends of the bore $C^3$ communicate respectively with the pipes B and $B^1$ and ports H, $H^1$ lead from this bore to the pipes $C^2$ and $C^1$. Further ports $H^2$, $H^3$, $H^4$, $H^5$ lead from the bore $C^3$ to the bore $C^5$, as shown. Stop members $C^7$ close the ends of the bore $C^5$ and act as stops for the piston $C^6$, one or each of these stop members being adjustable if desired, for example by placing a larger or smaller number of washers $C^8$ under its head.

The operation of the device C is as follows. The parts are shown in the position they occupy when the delivery of lubricant through the pipe B has just ceased and delivery through the pipe $B^1$ is about to begin. When delivery through the pipe $B^1$ begins, lubricant acts on the lefthand end of the valve $C^4$ to move it to the right, thus closing communication between the ports H and $H^2$ and between the port $H^5$ and the pipe B and opening communication between the ports $H^1$ and $H^3$. On continued delivery of lubricant through the pipe $B^1$, this lubricant passes through the pipe $H^4$ and acts on the lefthand end of the piston $C^6$ so as to move this piston to the right and thereby cause the lubricant which during the previous delivery of lubricant through the pipe B has filled the righthand end of the bore $C^5$ to be delivered from this righthand end through the ports $H^3$, $H^1$ to the pipe $C^1$. A similar operation occurs in each of the devices C so that lubricant is delivered through each of the pipes $C^1$. When each of the pistons $C^6$ has been moved over to the right, it will be seen that no further lubricant can be forced through the pipe $B^1$. The apparatus D then acts to stop delivery through the pipe $B^1$ and cause delivery through the pipe B, whereupon the valve $C^4$ is moved to the left so as to bring the pipe B into communication with the port $H^5$. Lubricant is thus delivered through the port $H^5$ to move the piston $C^6$ to the left and thus to discharge through the ports $H^2$, H the lubricant previously forced into the lefthand end of the bore $C^5$. When the piston $C^6$ of each of the devices C has come into contact with the lefthand stop $C^7$, further flow of lubricant through the pipe B is prevented and the device D then acts to stop delivery through the pipe B and begin delivery through the pipe $B^1$ to repeat the operation. In this way it will be seen that measured quantities of lubricant are delivered alternately through the pipes $C^1$ and $C^2$ and by varying the stroke of the pistons $C^6$ by adjustment of the stops $C^7$, the quantity of lubricant delivered on each stroke of the piston can be varied.

The pistons $A^3$ and $A^4$ cannot draw in lubricant from the pipes B and $B^1$ since these pipes do not communicate with any lubricant reservoir. What occurs in practice is of course that when, say, the piston $A^4$ begins its upward travel the valve $C^4$ (Figure 10) moves to the right, any lubricant at the righthand end of this valve being forced back into the cylinder $A^1$. After this has occurred, however, the pipe B is completely closed so that on further downward movement of the piston $A^3$ it can only draw in lubricant from the pipe $B^2$. While the valves $C^4$ are thus permitted free movement under the difference in pressure in the pipes B and $B^1$ respectively, after this movement has occurred no further lubricant can be withdrawn through the pipe B or $B^1$ into the cylinder which for the moment is being replenished so that the downward movement of the piston in that cylinder must draw in lubricant through the appropriate pipe $B^2$.

The apparatus is particularly suited for use with shuttle-type distributing apparatus of the general kind shown in Fig. 10. Further, special forms of pressure-operated change-over valve for reversing the flow of the operating liquid form an essential part of the apparatus and one such change-over valve is shown in Fig. 6.

The construction of the device D is shown in Figures 6, 7, 8 and 9. Thus, this device comprises a casing D containing a bore in which moves a shuttle valve J and a further bore in which moves a releasing plunger K, the inner ends of each of the bores being separated by a space $D^1$ in which lies releasing mechanism hereinafter described. The pipe $E^4$ communicates through passages and grooves $D^3$ in the casing D with ports $J^1$ and $J^2$ while the pipe $E^5$ communicates through grooves in the casing with ports $J^3$, $J^4$. The ports $J^1$, $J^2$, $J^3$, $J^4$ communicate with the bore in which the valve J lies respectively opposite to ports $J^5$, $J^6$, $J^7$, $J^8$ of which $J^5$ and $J^7$ lead to the pipe G while $J^6$ and $J^8$ lead to the pipe $G^1$. The valve J is provided with annular recesses $J^9$ which, when the valve is moved to the right into the position shown in Figure 6, brings the port $J^1$ into communication with the port $J^5$ and the port $J^4$ into communication with the port $J^8$ while, when it is moved into its lefthand position, they bring the port $J^3$ into communication with the port $J^7$ and the port $J^2$ into communication with the port $J^6$. Thus, in one position of the valve, the pipe G communicates through the ports $J^5$, $J^1$ and the groove $D^3$ with the pipe $E^4$ while the pipe $G^1$ communicates through the ports $J^8$, $J^4$ with the pipe $E^5$ while in the other position of the valve the pipe G communicates through the ports $J^7$, $J^3$ with the pipe $E^5$ while the pipe $G^1$ communicates through the ports $J^6$, $J^2$ with the pipe $E^4$. In this way the pump $A^6$ can be caused either to withdraw pressure liquid from the cylinder $A^2$ and deliver it to the cylinder $A^1$, or vice versa.

Each of the annular recesses $J^9$ communicates through a bore $J^{10}$ in the valve J with the adjacent end of the bore in which this valve moves so that when the righthand recess $J^9$ is in communication through the port $J^1$ with the pipe $E^4$, the righthand end of the valve J is subject to pressure tending to move it to the left and similarly the lefthand end of the valve J is subject to suction through the port $J^4$ and pipe $E^5$ also tending to move it to the left. Such movement is, however, prevented until the desired moment by frictional locking mechanism comprising two ball-type frictional locks L, $L^1$ surrounding the centre part of the valve J and adapted to be released by a releasing member $L^2$ connected to the releasing piston K, as shown.

The arrangement is such that when the righthand end of the valve J is subject to liquid pressure, the valve K will be maintained in its lefthand position so that the lock $L^1$ prevents movement of the valve J to the left until the pressure of the liquid in the pipe $E^4$ reaches a value which can be determined in accordance with requirements. Similarly, when pressure liquid is acting on the lefthand end of the valve J, the piston K will be maintained in its righthand position so that the lock L prevents movement to the right of the valve J until the pressure in the pipe $E^4$ again reaches a value which can be determined according to requirements.

Thus, each end of the cylinder in which the valve J moves is provided with a transverse port M which communicates with a pipe $M^6$, through a non-return inlet valve $M^1$ and through a delivery valve $M^3$ controlled by a spring $M^4$ adjustable by a setting device $M^5$. The pipe $M^6$ at the righthand end of the device in Figure 6 communicates with the lefthand end of the bore in which the piston K lies while the pipe $M^6$ at the lefthand end of the device communicates with the righthand end of the bore in which the piston K lies. Pressure gauges $M^7$ are provided for indicating the pressure in the two ends of the bore in which the valve J lies.

The operation is as follows. Assuming the valve J to be in the position shown in Figure 6, pressure liquid is then delivered through the pipe $E^4$ and the ports $J^1$, $J^5$ to the pipe G and withdrawn through the pipe $E^5$ and the ports $J^4$, $J^8$ from the pipe $G^1$. The piston $A^3$ is thus moved upwards to cause delivery of lubricant through the pipe B and this delivery continues until all the pistons $C^6$ in the devices C have been moved to the left. Since further delivery is thus prevented the pressure in the cylinder $A^1$ and the pipe G increases and the valve $M^3$ is so set that only when such increased pressure occurs does this valve open to permit pressure liquid to flow through the appropriate pipe $M^6$ to the lefthand end of the piston K. When this occurs the piston K moves to the right so that the member $L^2$ acts to release the frictional locking balls $L^1$ and thus permit the valve J to move to the left under the pressure acting on the right-hand end thereof. The pipe $E^4$ is thus brought into communication with the pipe $G^1$ and the pipe $E^5$ into communication with the pipe G so that pressure liquid is now delivered to the cylinder $A^2$ and withdrawn from the cylinder $A^1$. This operation continues until all the pistons $C^6$ have been moved to the right in the devices C whereupon the rise in pressure in the cylinder $A^2$ and pipe $G^1$ causes fluid to flow through the other valve $M^3$ and thus causes the piston K to move to the left and release the friction lock L and permit the valve J to move to the right. The valve $M^1$ permits the flow of pressure liquid from the appropriate end of the bore in which the piston K lies as this valve is moved over by pressure supplied to the other end of the bore through the appropriate valve $M^3$.

In this way the reversal of flow in the pipes G, $G^1$ is caused automatically by increase in pressure occurring in the pipe to which pressure liquid is for the moment being delivered when further upward movement of the appropriate piston $A^3$ or $A^4$ is prevented owing to all the pistons $C^6$ of the devices C having been moved to deliver the required measured quantity of lubricant.

In order to produce a snap action movement of the valve J, each end of the bore in which the valve J lies is conveniently also connected to one end of an air bottle or like pressure accumulator comprising a piston N disposed in a cylinder $N^1$ and acted upon by a spring $N^2$. Thus, during delivery of liquid under pressure to either end of the cylinder in which the valve J lies, the appropriate piston N will be forced back against its spring $N^2$. When the device $L^2$, however, releases the appropriate friction lock L or $L^1$, the valve J will be caused to move with a rapid snap action owing to the maintenance of liquid pressure acting thereon by the device N, $N^1$, $N^2$.

It will be appreciated that by appropriate setting of the compression of the springs M⁴ by means of the devices M⁵, the pressure at which the piston K will be moved to release the valve J can be varied to suit requirements. Thus, in practice, the devices M⁵ may be screwed up to increase the pressure of the springs M⁴ gradually until a point is reached at which all the pistons C⁶ of the devices C are caused to move over before the piston K moves to permit movement of the valve J. The compression of the springs M⁴ may then be increased by a suitable amount, for example so as to increase the pressure necessary to open the ball valves M³ by, say, 200 pounds per square inch for safety's sake when the proper operation of the apparatus will be ensured without excessive pressures being necessary. It will be seen that at all times the liquid pressures can be ascertained from the pressure gauges M⁷ so that the apparatus can readily be set to provide the appropriate margin of pressure over the minimum necessary to cause proper operation.

It will be understood that an arrangement similar in other respects to that described above might be employed but with the actual back and forth movement of the piston K and of the valve J caused by pressure derived from the pipes B, B¹ instead of from the pipes E⁴, E⁵.

It will also be seen that the device D with its control members M⁵ can be placed in any convenient position since it is coupled to the rest of the apparatus purely by pipe connections. This means that the device D can be placed, for example, in a position where the pressure gauges M⁷ can readily be seen and the devices M⁵ readily adjusted, for example with the devices C actually in view so as to ensure that the adjustment is such that all these devices are caused to operate satisfactorily. Again, the sight feed device E² may be located near to the member D so as to be readily visible from the point where adjustment of the apparatus is effected.

What we claim as our invention and desire to secure by Letters Patent is:

1. Distributing apparatus of the piston and cylinder type for liquid and semi-liquid substances including in combination two similar cylinders, a free piston in each cylinder dividing it into two chambers, inlet and delivery passages for the substance to be distributed communicating with one chamber of each cylinder, pump apparatus for delivering operating liquid at a determined rate to the other chamber of one cylinder and simultaneously withdrawing operating liquid from the other chamber of the other cylinder and means subject to and actuated by an increase in the pressure in the cylinder to which operating liquid is at the moment being delivered when movement of the piston in that cylinder is prevented for automatically causing reversal of flow of the operating liquid.

2. Distributing apparatus of the piston and cylinder type for liquid and semi-liquid substances including in combination two similar cylinders, a free piston in each cylinder dividing it into two chambers, inlet and delivery passages for the substance to be distributed communicating with one chamber of each cylinder, pump apparatus for delivering operating liquid at a determined rate to the other chamber of one cylinder and simultaneously withdrawing operating liquid from the other chamber of the other cylinder, a pressure-operated change-over valve on which the pressures of the operating liquid in the two cylinders act respectively in opposite directions for causing reversal of flow of the operating liquid, and a retaining device whereby the change-over valve is held from movement in either direction until a predetermined difference in pressure in the two cylinders occurs.

3. Distributing apparatus of the piston and cylinder type for liquid and semi-liquid substances including in combination two similar cylinders, a free piston in each cylinder dividing it into two chambers, inlet and delivery passages for the substance to be distributed communicating with one chamber of each cylinder, pump apparatus for delivering operating liquid at a determined rate to the other chamber of one cylinder and simultaneously withdrawing operating liquid from the other chamber of the other cylinder, a change over piston valve the opposite ends of which are subject respectively to the pressures of operating liquid in the two cylinders, this change over valve when moved longitudinally causing reversal of flow of the operating liquid, and a retaining device whereby the change over valve is held from movement in either direction until a predetermined difference in pressure in the two cylinders occurs.

4. Distributing apparatus of the piston and cylinder type for liquid and semi-liquid substances including in combination two similar cylinders, a free piston in each cylinder dividing it into two chambers, inlet and discharge passages for the substance to be distributed communicating with one chamber of each cylinder pump apparatus for delivering operating liquid to the chamber of one cylinder and simultaneously withdrawing operating liquid from the other chamber of the other cylinder, a change-over piston valve the opposite ends of which are subject respectively to the pressures of operating liquid in the two cylinders, this change-over valve when moved longitudinally causing reversal of flow of the operating liquid, locking mechanism adapted to hold the change over valve from movement, and releasing means adapted to be actuated automatically to release the locking mechanism when the difference in pressure in the two cylinders reaches a predetermined value.

5. Distributing apparatus of the piston and cylinder type for liquid and semi-liquid substances including in combination two similar cylinders, a free piston in each cylinder dividing it into two chambers, inlet and delivery passages for the substance to be distributed communicating with one chamber of each cylinder, pump apparatus for delivering operating liquid at a determined rate to the other chamber of one cylinder and simultaneously withdrawing operating liquid from the other chamber of the other cylinder, a pressure-operated change-over valve for causing reversal of flow of the operating liquid, and on which the pressures of the operating liquid in the two cylinders act in opposite directions, locking mechanism for preventing movement of the change-over valve, and pressure-operated mechanism for releasing the locking mechanism when a predetermined difference in pressure in the two cylinders occurs.

6. Distributing apparatus of the piston and cylinder type for liquid and semi-liquid substances including in combination two similar main cylinders, a free piston in each main cylinder dividing it into two chambers, inlet and delivery passages for the substance to be distributed communicating with one chamber of each cylinder, pump apparatus for delivering operating liquid at a determined rate to the other chamber of one main cylinder and simultaneously withdrawing operating liquid from the other chamber of the other main cylinder, a pressure-operated change-over valve for causing reversal of flow of the operating liquid, and on which the pressures of the operating liquid in the two main cylinders act in opposite directions, two locking devices acting in opposite directions on the change-over valve, a releasing member for releasing one or other of the locking devices according to the direction of movement of the releasing member, a piston for actuating the releasing member disposed in a cylinder, and means which include adjustable pressure-operated valves connecting the ends of the said releasing member cylinder to the two main cylinders of the apparatus.

7. Distributing apparatus of the piston and cylinder type for liquid and semi-liquid substances including in combination two similar main cylinders, a free piston in each main cylinder dividing it into two chambers, inlet and delivery passages for the substance to be distributed communicating with one chamber of each main cylinder, pump apparatus for delivering operating liquid at a determined rate to the other chamber of one main cylinder and simultaneously withdrawing operating liquid from the other chamber of the other main cylinder, means subject to and actuated by an increase in the pressure in the cylinder to which operating liquid is at the moment being delivered when movement of the piston in that cylinder is prevented for automatically causing reversal of flow of the operating liquid, a double-acting distributing piston arranged in a cylinder the opposite ends of which are connected respectively to the two delivery passages, and valve means whereby during movement of the distributing piston in each direction due to the delivery of the substance to one end of its cylinder, the other end of its cylinder is cut off from its delivery pipe and the substance which was delivered to such other end during the preceding stroke of the distributing piston is discharged by such piston through a feed passage.

8. Distributing apparatus of the piston and cylinder type for liquid and semi-liquid substances including the combination of elements set forth in claim 7 in which the valve means comprises a shuttle type piston valve the ends of which are subject to the pressures in the two delivery pipes and which, when the substance is delivered through one delivery pipe, is moved in one direction to open communication between such delivery pipe and the adjacent end of the cylinder of the distributing piston, to close communication between the other end of the cylinder of the distributing piston and its delivery pipe and to bring such other end of the cylinder of the distributing piston into communication with its feed passage.

9. Distributing apparatus of the piston and cylinder type for liquid and semi-liquid substances including the combination of elements set forth in claim 2 with a pressure accumulator in communication with each end of the cylinder in which the change over valve moves whereby, on release of the change over valve, it is caused to move with a snap action.

10. Distributing apparatus of the piston and cylinder type for liquid and semi-liquid substances including the combination of elements set forth in claim 4 with a pressure accumulator in communication with each end of the cylinder in which the change over valve moves whereby, on release of the change over valve, it is caused to move with a snap action.

FRANK NEWTON TRIER.
PAUL FAULKNER CROTHERS.